W. KALMS.
CAR COUPLING.
APPLICATION FILED MAR. 23, 1911.

1,066,733.

Patented July 8, 1913.

Witnesses:
Harry C. Hebig
R. Brockman

Inventor
Wilhelm Kalms
By his Attorney
Max Ordmann

UNITED STATES PATENT OFFICE.

WILHELM KALMS, OF MYSTIC, CONNECTICUT.

CAR-COUPLING.

1,066,733. Specification of Letters Patent. Patented July 8, 1913.

Application filed March 23, 1911. Serial No. 616,306.

*To all whom it may concern:*

Be it known that I, WILHELM KALMS, a citizen of the United States of America, residing at Mystic, in the county of New London and State of Connecticut, have invented certain new and useful Improvements in Car-Couplings, of which the following is a specification.

The object of this invention is to provide an automatic car coupling that will not require the presence of a man between the cars to be coupled and thus avoid accidents.

To accomplish this object, my invention consists in the construction, combination and arrangement of parts as hereinafter specified.

Figure 1:
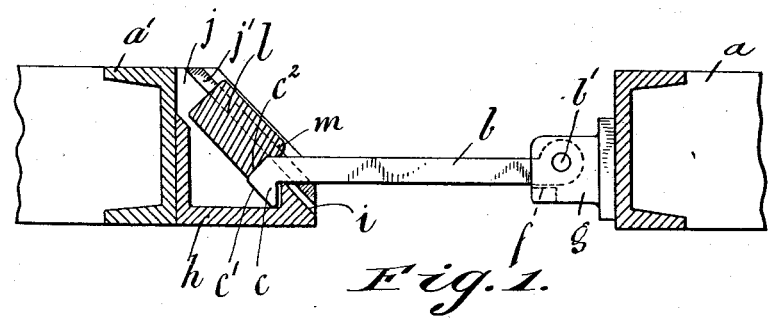
Figure 2:
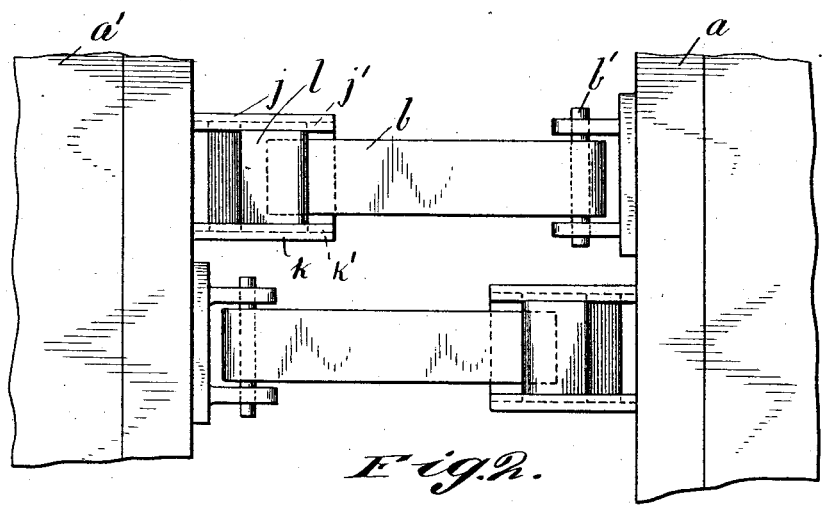
Figure 3:
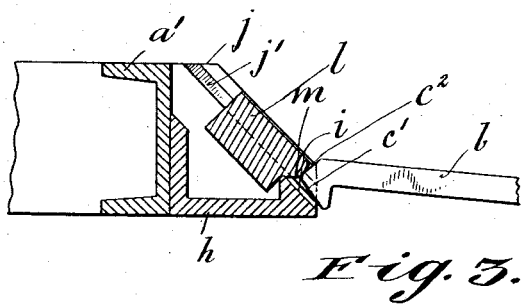

In the accompanying drawing, which forms a part of this specification, similar reference letters denote corresponding parts and Figure 1 is a sectional side elevation; Fig. 2 a plan view and Fig. 3 a view similar to that of Fig. 1, a part being broken off, and the parts shown in operating position.

$a$, $a'$ denote the two cars to be coupled. At the end of one car is a bar $b$ which is capable of swinging vertically around a fulcrum $b'$ in an upward direction from a horizontal line and the forward end of which is formed with a hook $c$ having slanting or angular edges $c'$, $c^2$. A shoulder $f$ in the bracket $g$ in which the bar is fulcrumed serves as a stop to normally hold the locking bar in horizontal position and to prevent it from tilting downwardly relative to a horizontal line.

To the end of the opposite car $a'$ a receiving member $h$ is attached, which is made in form of an open topped box, the forward wall of which is formed with a slanting edge $i$ and in the lateral walls $j$, $k$, of which slanting guide grooves $j'$, $k'$ are provided. Slidably engaging these guide grooves is a sliding member in the form of a heavy block $l$, the lower end of which has a projecting rounded portion $m$.

The operation of my coupling is as follows: Normally the bar of one car extends horizontally and the slide or block of the opposite car is in the lowest position, resting on the upper margin of the slanting edge $i$ of the receiving member, so that the rounded portion $m$ of the block projects forwardly and downwardly below the margin of the slanting edge $i$. Now, as the two cars approach one another, the bar is caused to swing upward, owing to the edge $c'$ of the locking bar sliding up the edge $i$ of the receiving member, and the edge $c^2$ of the bar lifts the block $l$ until the cars have approached so near that the hook portion $c$ of the bar has passed over the upper margin of the edge $i$ and drops down engaging therewith (Fig. 1). The block by its weight then sinks onto the bar and thereby holds it in locked position.

In practice, it may be advantageous to equip each car with both a locking bar and a receiving hook, so that there will be a reciprocal interlocking of the two cars as illustrated in Fig. 2.

What I claim and desire to secure by Letters Patent is:

1. In a car coupling, the combination with two cars, of a vertically swinging locking member on one car formed with a hook and having a prismatic forward edge, a receiving member on the opposite car formed with a counterhook to engage said swinging member, the outer edge of which is slanting, and a weighted sliding member in said receiving member formed with a downward rounded projection, the prismatic edge of the swinging member being adapted on rising over the slanting edge of the receiving member to act against the rounded projection of the weighted member and lift the latter, and the said weighted member being adapted on the two first named members being locked, to drop onto the swinging member and to rest with its rounded projection on the latter.

2. In a car coupling, the combination with two cars, of a vertically swinging locking member on one car formed with a hook and having a prismatic forward edge, a receiving member on the opposite car formed with a counterhook to engage said swinging member and having slanting lateral guide grooves, a weighted member slidably guided in said grooves and having a downward rounded projection, the prismatic edge of the said swinging member being adapted on rising over the slanting edge of the receiving member to act against the said projection and lift the said weighted member, and the latter being adapted upon the locking of the two first named members to drop onto the swinging member and to rest with its rounded projection on the latter.

In testimony whereof I affix my signature in presence of two witnesses.

WILHELM KALMS.

Witnesses:
 HERMAN KALMS,
 JOHN T. CARMODY.

Copies of this patent may be obtained for five cents each, by addressing the "Commissioner of Patents, Washington, D. C."